Oct. 10, 1939.  E. O. DIETERICH  2,175,685
RESILIENT BALL
Filed Oct. 25, 1935
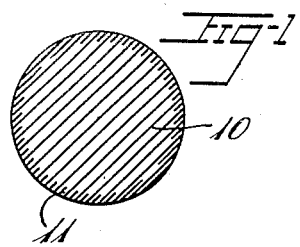
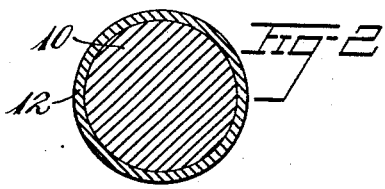
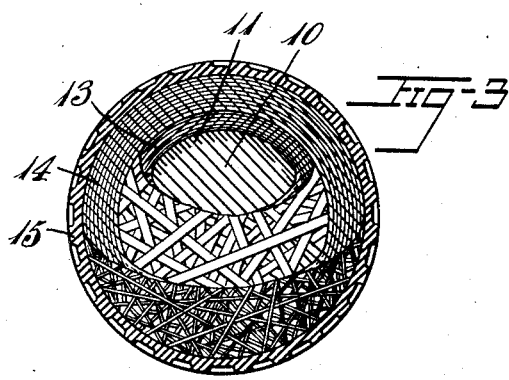
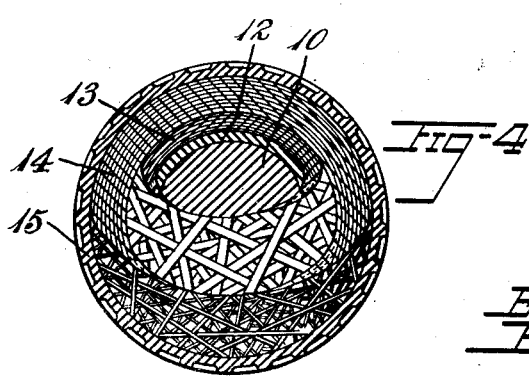
Inventor
Ernest O. Dieterich
By Eakin & Avery
Attys.

Patented Oct. 10, 1939

2,175,685

UNITED STATES PATENT OFFICE 2,175,685

RESILIENT BALL

Ernest O. Dieterich, Akron, Ohio, assignor to The B. F. Goodrich Company, New York, N. Y., a corporation of New York Application October 25, 1935, Serial No. 46,771

10 Claims. (Cl. 273—62)

This invention relates to the manufacture of resilient balls such as golf balls and has particular reference to the core or innermost component thereof.

The object of this invention is to provide a core of high resilience and one which is less expensive to manufacture than the present types. Other advantages of the proposed construction will be evident from the description following.

Heretofore it has been customary to use one or the other of two types of core in the construction of resilient balls. One type consists of a sphere of vulcanized rubber loaded with fillers to provide the necessary weight. The second type consists of a hollow shell or bag of vulcanized rubber filled with a paste or with a liquid which may or may not contain the loading fillers. The retaining shell may contain the loading fillers.

Both of these constructions have certain disadvantages. Vulcanized rubber cores are relatively expensive to manufacture because of the considerable time and labor required. Liquid cores are difficult to produce and maintain in perfect balance, for the fillers in time will settle out, producing an unbalanced condition which seriously affects the accuracy of the flight of the ball, while in cores in which the liquid is not weighted, unavoidable variations in the wall thickness of the loaded shell produce a condition of unbalance similar to that caused by the settling out of the fillers in the liquid.

This invention consists in manufacturing cores for resilient balls such as golf balls, baseballs and the like, from unvulcanized rubber with or without loading fillers, as required. By a simple vulcanizing process I provide the unvulcanized core with a thin cover of tough vulcanized rubber to give adequate strength to prevent, when used in wound balls, the subsequent windings from cutting into the core and to prevent the unvulcanized rubber from flowing into the interstices between the windings. Alternatively, the core may comprise a pellet of unvulcanized rubber and a separate surface layer of vulcanized rubber surrounding the pellet.

It has been discovered that the resilience of unvulcanized rubber compressed by the pressure produced by the windings, when subjected to impacts of very short duration, such as the impact of a golf club, is as great as, or greater than, that of vulcanized rubber or of a paste or liquid-filled container similarly enclosed in windings under tension. Furthermore, it is simple and inexpensive to manufacture such an unvulcanized core, for it is unnecessary to use much of the expensive equipment required for the conventional cores.

The foregoing and other objects, features and advantages of my invention will be clearly understood from the following description and the accompanying drawing in which Fig. 1 represents a cross-section of an integral core, Fig. 2 a similar section of a core provided with a separate covering layer, and Figs. 3 and 4 represent sections of golf balls containing such cores.

Rubber is plasticized in any standard rubber plasticizing machine such as a roll mill, or an internal mixer, or any other type of masticating machine, until it has been reduced to the consistency desired. Alternatively, the rubber may be broken down to the extent required by the application of heat and/or by the addition of chemicals which produce the required effect or by any other means. Fillers to give the desired loading may be added at any convenient stage in the process. The preferred end desired is a soft, highly plastic mixture which may be molded to the required shape easily and may be produced by any method preferred. Although subsequent processes are more easily carried out if the rubber is well broken down, it may be of advantage for some applications to masticate the rubber only slightly, and I do not desire to limit the scope of my invention to highly plasticized rubber alone, but to include rubber of all degrees of plasticity.

The term rubber where used in these specifications and claims is intended to include India rubber, Pontianak, guayule and other rubber-containing gummy vegetable exudates, as well as vulcanizable synthetic rubber-like materials, reclaimed rubber and whether admixed with fillers, pigments, colors, and/or any other compounding ingredients used in the rubber industry.

After the proper degree of mastication and mixing has been attained, the rubber composition is formed into the shape of a spherical pellet of the proper size and weight by any convenient method. This may be done by cutting it into pieces of proper weight and molding by hand. The rubber compound may be extruded from a tubing machine and formed to the proper shape in a mold with or without the application of external heat, or by any other convenient means known to the molding art.

After the core has been formed the outer layer may be vulcanized. The preferred method comprises the immersion of the core in a solution of sulfur chloride for an appropriate length of time, depending upon the thickness of the vulcanized covering to be produced. However, any other means of vulcanizing may be employed such as the Peachey process, or vulcanization by means of sulfur, or polysulfides, or any other method known to the art. If necessary, vulcanization is followed by neutralization and washing.

If a separate covering layer is used, the unvulcanized pellets are coated with a suitable rubber composition preferably by dipping in a liquid dispersion of rubber such as latex or a rubber solution or by encasing it in a shell of rubber by a molding process, or even, if desired, by slipping it into a previously vulcanized rubber bag. The coating may contain vulcanizing agents, or may even contain ingredients which interact with others present in the under-lying pellet to bring about vulcanization of the coating.

As a specific example of one embodiment of the invention, an unvulcanized rubber composition is prepared by mixing in the usual way 385 parts by weight of smoked sheet rubber, an equal quantity of guayule rubber, 16 parts of paraffin and 784 parts of red iron oxide. This composition is molded into spherical pellets of the desired size by any suitable means, such as a mechanical molding press, and the pellets are immersed for 120 seconds in a 2% solution of sulphur chloride in benzene. The balls thus produced, as illustrated in Fig. 1, consist of a body 10 of unvulcanized rubber and an integral surface 11 of vulcanized rubber. These balls may be used as playing balls or may be used as cores for wound balls such as golf balls or baseballs. For example, if golf balls are to be made, they are enclosed in a winding, the first layer 13 (Fig. 3) of which may be made from a moderately wide rubber tape, and the remainder 14 from rubber thread, both being wound under tension, and then provided with a tough molded cover 15 of gutta percha or rubber. The winding is most readily applied if the core is first thoroughly chilled to stiffen or freeze the rubber, which prevents the initial convolutions of the winding from distorting the core.

The composition of the unvulcanized rubber is subject to wide variations, depending on the specific gravity and other characteristics desired. Thus other fillers such as white lead or litharge may be substituted for the red iron oxide and the proportions may be modified to produce any desired weight, plasticity, etc.

In case it is preferred to apply a separate vulcanized surface layer 12 to the unvulcanized center 10 (Fig. 2), a spherical pellet may be molded from the composition recited above, may be impaled on a wire and dipped in a liquid latex composition containing the quantity of concentrated latex containing 100 parts of rubber along with 1.5 parts of zinc oxide, 1.5 parts of sulphur and 0.5 part of tetramethyl thiuramdisulphide. The latex film is dried, the ball is removed from the wire, the hole left by the wire is patched with a drop of the same liquid which is also dried, then the coating is vulcanized, say in boiling 30% calcium chloride solution for an hour, and then rinsed and dried.

Alternatively, the vulcanized layer 12 may be applied to the unvulcanized core 10 by molding, say in a two-part mold which forms two sheets of vulcanizable rubber around the spherical core, squeezes them together to form a circumferential seam and pinches off the excess. The surface layer is then vulcanized in any suitable manner, for example by immersion in a heated fluid as described above, or in a heated mold, the method, temperature and time of vulcanization depending on the composition of the vulcanizable coating.

The unvulcanized rubber spheres 10 provided with separate surface layers 12 of vulcanized rubber may be used as cores for golf balls by providing them with successive windings 13 and 14 of rubber tape and thread and a cover 15, as is shown in Fig. 4.

From the foregoing description, it is evident to anyone skilled in the art that my method of making cores of resilient balls offers many economies in manufacture. It is merely necessary to plasticize the rubber, mix it with the appropriate fillers, mold it to the required form and vulcanize a surface layer on the outside of the core. It obviates the use of much expensive, cumbersome machinery and greatly reduces labor requirements.

By means of a mechanical driving machine designed to deliver identical impacts to successive balls and substantially duplicating the tee shot in the conventional golf game, it has been established that golf balls made according to this invention are equal to or superior to the standard golf ball in distance of flight.

It is understood that I do not wish to limit my invention to the specific embodiments described above, for the proportions of different ingredients must necessarily be varied through a wide range in order to be adapted to resilient balls of all kinds, and the details of procedure are subject to considerable variation without departing from the spirit of the invention as hereinafter defined.

I claim:

1. The method of making a resilient ball which comprises coating a solid sphere of unvulcanized rubber with a thin layer of vulcanizable rubber and vulcanizing the latter.

2. The method of making a resilient ball which comprises coating a solid sphere of unvulcanized rubber with a thin layer of vulcanizable latex, drying the latex and vulcanizing the coating.

3. The method of making a golf ball core which comprises molding a shell of vulcanizable rubber around a solid sphere of unvulcanized rubber, and vulcanizing the shell.

4. The method of making a golf ball which comprises forming weighted unvulcanized rubber into a solid sphere, superficially vulcanizing it, winding a tensioned rubber thread thereon, and applying a molded cover.

5. The method of making a golf ball which comprises forming unvulcanized rubber into a solid sphere, applying a coating of vulcanizable rubber, vulcanizing the coating, winding a tensioned rubber thread thereon, and applying a molded cover.

6. The method of making a golf ball which comprises forming weighted unvulcanized rubber into a solid sphere, providing it with an imperforate surface layer of vulcanized rubber, winding a tensioned rubber thread thereon, and applying a molded cover.

7. A ball comprising a solid sphere consisting throughout of resilient rubber, of which the major portion is unvulcanized rubber and the surface is an imperforate layer of vulcanized rubber.

8. A golf ball comprising a solid sphere consisting throughout of resilient rubber, of which the major portion is unvulcanized rubber and the surface is an imperforate layer of vulcanized rubber, a tensioned winding of rubber on the sphere, and a cover.

9. The method of making a resilient ball which comprises forming a mass of unvulcanized rubber into a solid sphere and providing it with an imperforate surface layer of vulcanized rubber.

10. The method of making a resilient ball which comprises forming a mass of unvulcanized rubber into a solid sphere and superficially vulcanizing the rubber of the sphere.

ERNEST O. DIETERICH.